Figure 1:
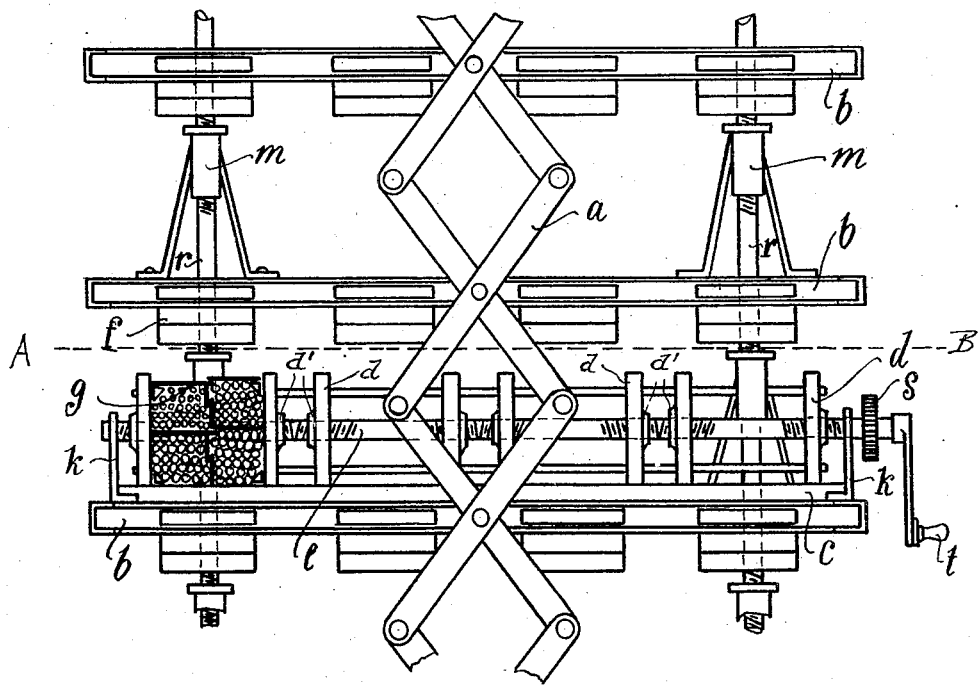

R. WOERNER.
APPARATUS FOR PRESSING CIGARS.
APPLICATION FILED NOV. 15, 1905.

917,984.

Patented Apr. 13, 1909.
7 SHEETS—SHEET 1.

Witnesses
Edwin L. Yewell
W. R. Allen

Inventor
Robert Woerner
By W. Schroenborn
Attorney

R. WOERNER.
APPARATUS FOR PRESSING CIGARS.
APPLICATION FILED NOV. 15, 1905.

917,984.

Patented Apr. 13, 1909.
7 SHEETS—SHEET 3.

R. WOERNER.
APPARATUS FOR PRESSING CIGARS.
APPLICATION FILED NOV. 15, 1905.
917,984.
Patented Apr. 13, 1909.
7 SHEETS—SHEET 4.
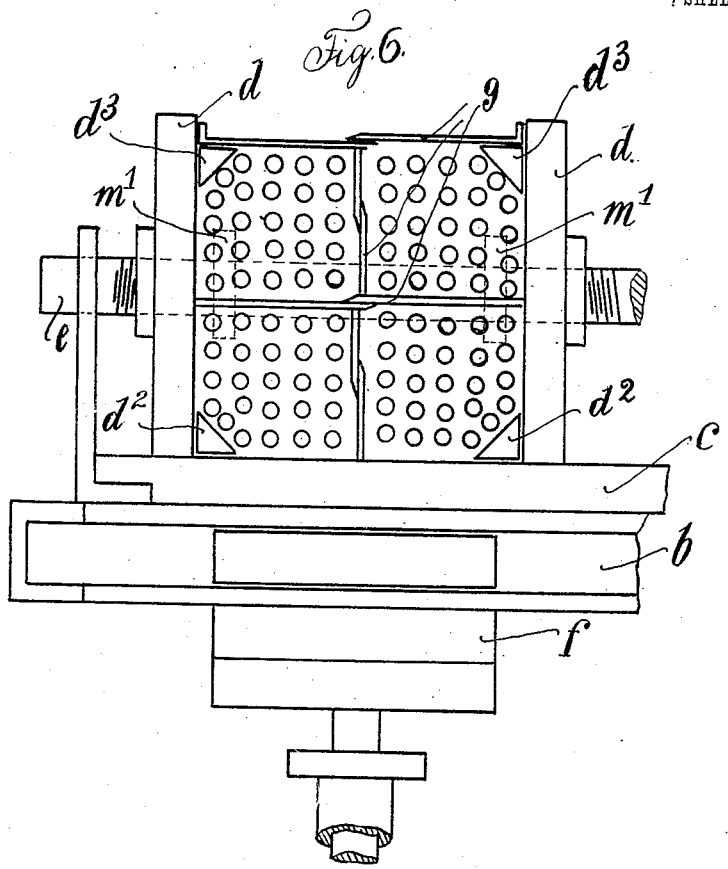
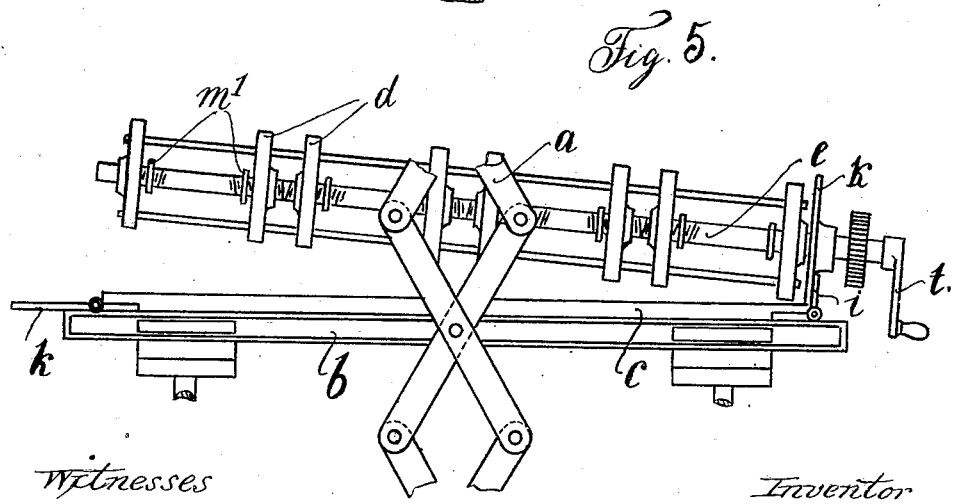
Witnesses
Edwin L. Yewell
W. B. Allen
Inventor
Robert Woerner
W. Gehrenborn
By
Attorney

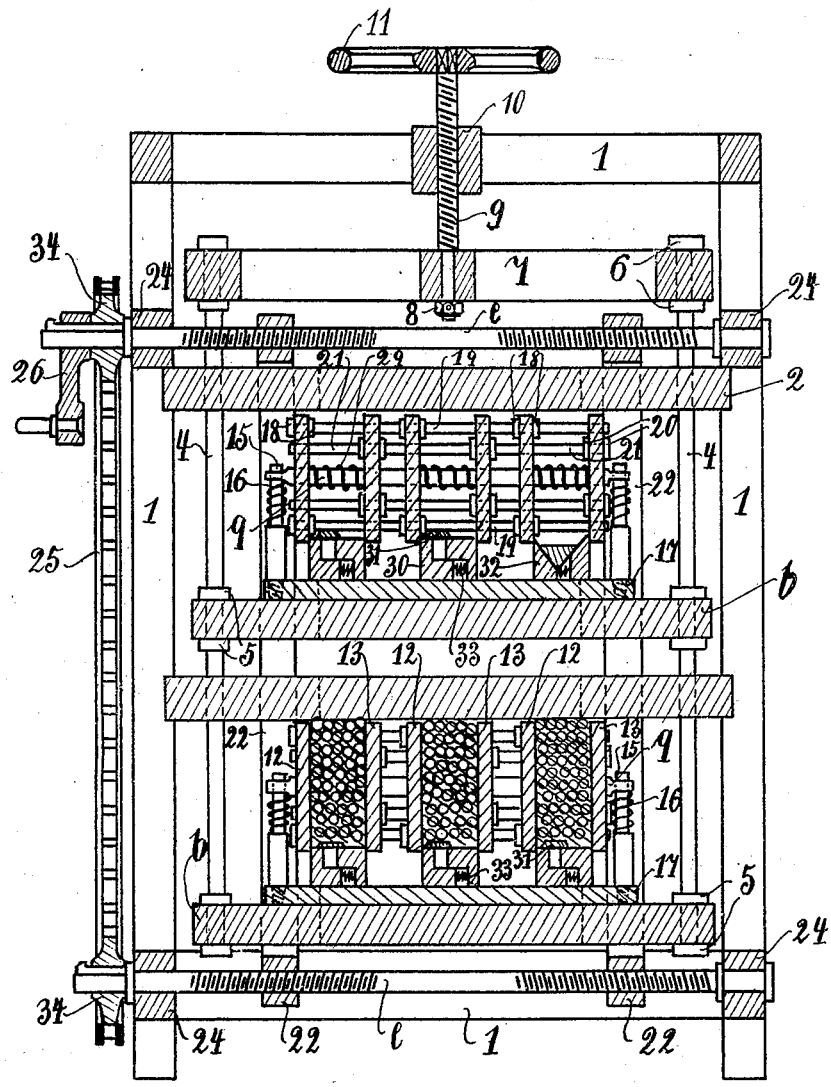

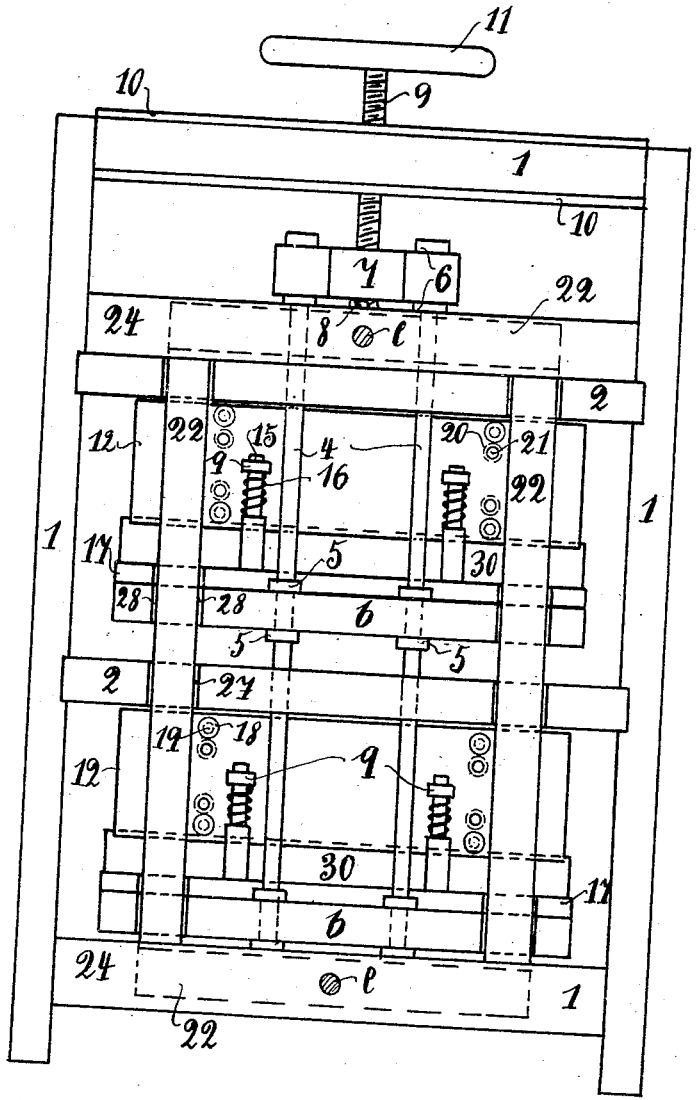

R. WOERNER.
APPARATUS FOR PRESSING CIGARS.
APPLICATION FILED NOV. 15, 1905.

917,984.

Patented Apr. 13, 1909.
7 SHEETS—SHEET 7.

UNITED STATES PATENT OFFICE.

ROBERT WOERNER, OF MANNHEIM, GERMANY.

APPARATUS FOR PRESSING CIGARS.

No. 917,984.     Specification of Letters Patent.     Patented April 13, 1909.

Application filed November 15, 1905. Serial No. 287,445.

*To all whom it may concern:*

Be it known that I, ROBERT WOERNER, a citizen of the Empire of Germany, residing at Mannheim, in the Empire of Germany, have invented a new and useful Apparatus for Pressing Cigars, of which the following is a specification.

As is well known, the wrapped cigars require to be pressed more or less strongly, so as to remove the inequalities between the several cigars and to insure as uniform as possible a burning of the cigars. With the usual mode of pressing the wrapped cigars it was not possible to avoid an irregular pressing of the cigars, since those cigars, which are nearer to the point of application of the press, were necessarily pressed much more than the cigars disposed farther off from the said point. Moreover, it was not possible to so adjust both the pressure in the vertical direction and the pressure in the horizontal direction, so as to totalize or uniformly distribute the pressure. I have discovered, that a satisfactory result could be obtained only in case the vertical pressure stands in a certain proportion to the horizontal pressure, and if at the same time the cigars are permitted to stretch in either direction, when the pressure acts on them in the other direction.

With my new apparatus the pressing of the cigars is preferably effected in the manner, that the pressure in either direction at right angles to the cigars is increased step by step and after each step a little decreased, the pressure in the vertical direction being applied alternately with that in the horizontal direction. In other words, the cigars are first subjected to a certain pressure in say the vertical direction, so that they can stretch in the horizontal direction, then they are a little loosened, afterward subjected to a certain pressure in the horizontal direction during which they can stretch in the vertical direction, next they are a little loosened, thereupon subjected to an increased pressure in the vertical direction and again a little loosened, after which they are subjected to an increased pressure in the horizontal direction and again a little loosened, and so on, until the cigars are sufficiently compressed. Thus the materials of the cigars are given time to adjust themselves in all directions, so that very good cigars will result, which will burn favorably. The irregularities produced during the wrapping of the fillers will be completely corrected, the pores or draft channels in the cigars will be equalized and therefore the cigars will be essentially improved upon. The new apparatus also renders it possible to give faces to all cigars, the simplest way of so doing being to place on each layer of cigars a sheet metal piece, the width of which corresponds to the length of the cigars and the length of which corresponds to that of the cigar-boxes. Then the lower layers of cigars will not be pressed by the upper layers of cigars as hitherto, but by the sheet metal piece on them. The new apparatus also permits to properly and uniformly press cigars of special shapes and this in the manner, that forms of cork or any other elastic material are employed, in which the mouth-pieces of the cigars, that is to say, the ends of the cigars, which are taken into the mouth for smoking, are placed during the pressing operation. For each special shape of the cigars a corresponding special shape of the elastic forms will be required for the mouthpieces of the cigars. These elastic forms will contribute to the totalization a uniform distribution of the pressure, they taking up the pressure, which is produced during the pressing of the thicker portions of the cigars, and thus they insure the desired uniform quality of the cigars.

For carrying out my invention various apparatuses and packing devices may be used. Each apparatus is arranged for producing at will a pressure in the vertical direction as well as in the horizontal direction, also for increasing and reducing the pressure at will.

The apparatus comprises several superposed tables, by which compartments are formed. The cigars are placed in packing devices, where they are grouped and superposed, and these packing devices are placed in the several compartments of the apparatus and there subjected to the pressures in the manner indicated above. The packing devices are arranged for extending each time the respective pressure in either the vertical or the horizontal direction is reduced, so that the cigars are permitted to stretch.

I will now proceed to describe my invention with reference to the accompanying drawings, in which—

Figure 2:
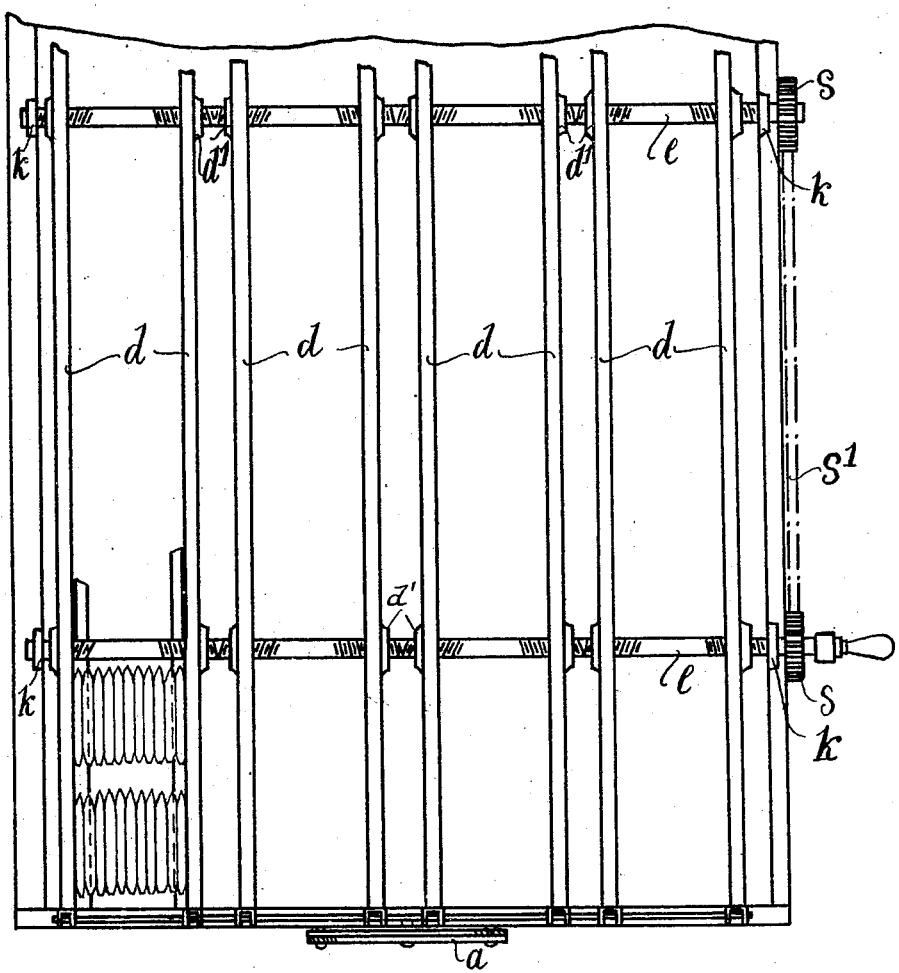
Figure 3:
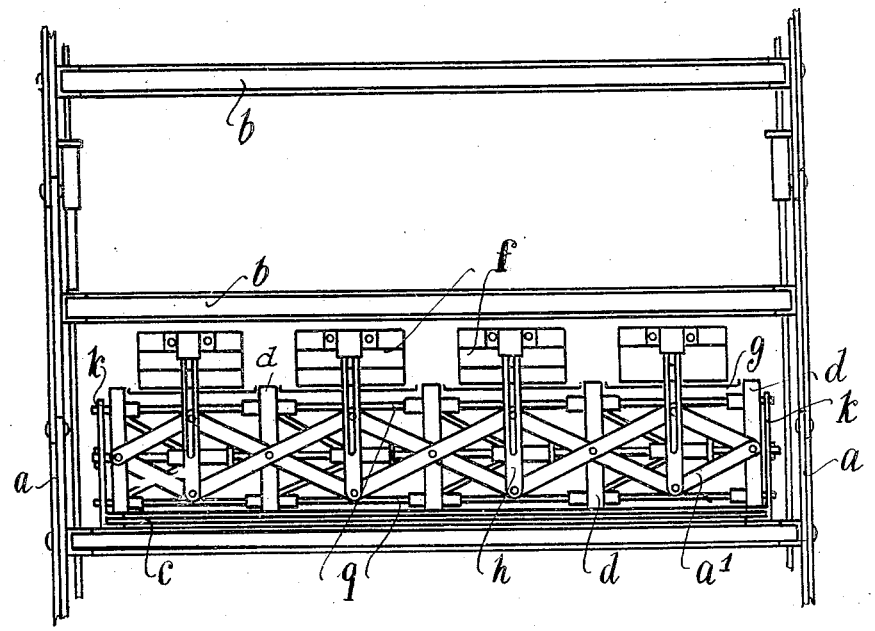
Figure 4:
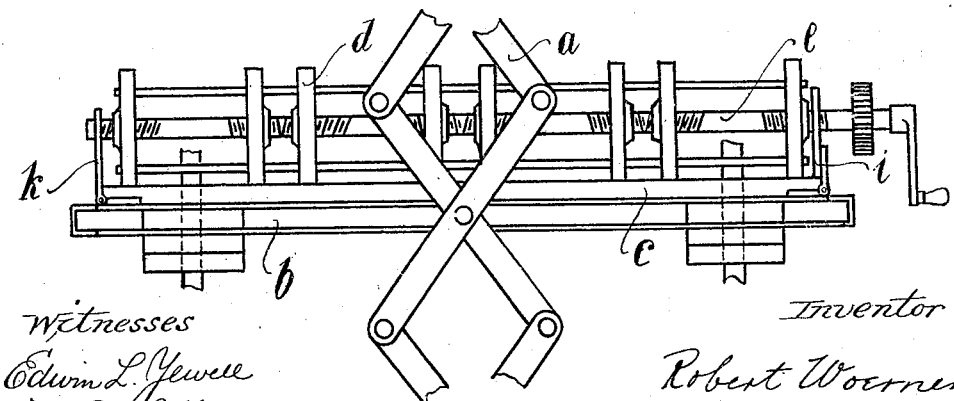
Figure 9:
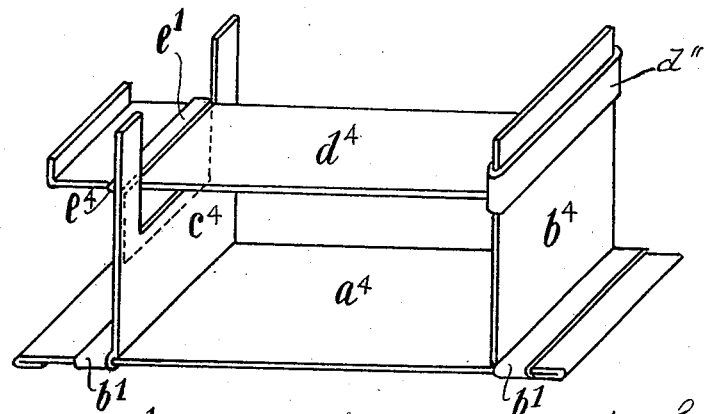
Figure 10:
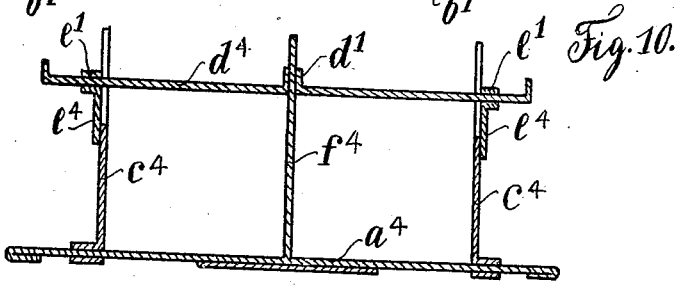
Figure 11:
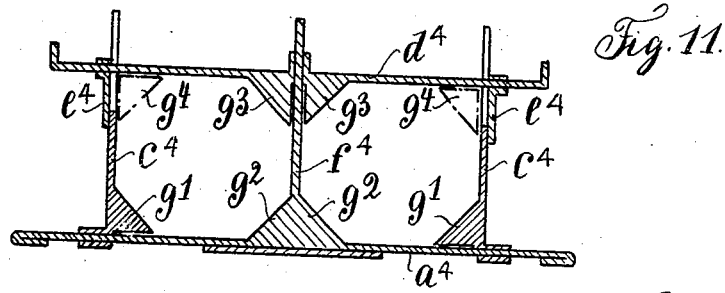
Figure 12:
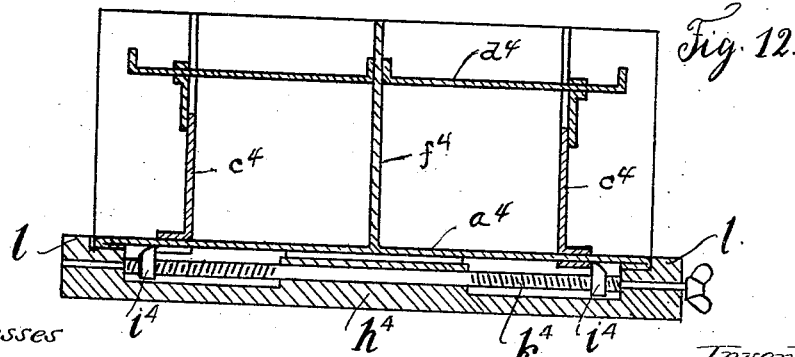

Figure 1 is an elevation of a part out of an apparatus and shows several superposed tables, and means for moving them toward and away from each other in the vertical direction, and a packing device with four packing boxes on the lowermost table, Fig. 2 is a horizontal section through the line A—B in Fig. 1, Fig. 3 is a side view of the superposed tables in Fig. 1 and shows a modified packing device on the lowermost table, Fig. 4 shows the packing device of Fig. 1 in a slight modification, Fig. 5 shows this modified packing device in a turned up position, Fig. 6 shows on an enlarged scale the left part of the packing device in Fig. 1, Fig. 7 is a vertical longitudinal section through another apparatus, Fig. 8 is a side view of the same, seen from left to right in Fig. 7, the driving chain and wheels on the side being removed, Fig. 9 is a perspective view of another packing box, Fig. 10 is a vertical longitudinal section through a modification of this packing box, Fig. 11 is a vertical longitudinal section through another modification of the same, and Fig. 12 shows the same packing box as in Fig. 10 in combination with an adjusting device.

An apparatus for carrying out my invention is partly shown in Figs. 1, 2 and 6. It comprises a plurality of superposed tables $b\ b$, which are vertically guided in a frame of any known construction (not shown). I do not describe the construction of the several tables $b\ b$, as it is immaterial and may be of any known kind. On two opposite sides the several tables $b\ b$ are connected with each other by means of two systems of links $a\ a$, the crossing points of which carry the respective tables $b\ b$. The lower ends of the two systems $a\ a$ may be connected with the bottom of the apparatus (not shown), while the upper ends may be connected with some known means (not shown), which serve for shortening and extending at will the two systems $a\ a$, so as to move the several tables $b\ b$ toward and away from each other. Each table $b$ is shown as provided on its bottom surface with four pressing blocks $f f$, which reach from near the one edge to near the opposite edge of the table $b$. Four vertical guiding rods $r\ r$ may be disposed, which pass through the several tables $b\ b$ near their edges, and adjustable stops $m\ m$ may be arranged on these rods $r\ r$ for limiting the motion of the tables $b\ b$ toward each other. On each table $b$ a packing device of the following construction can be placed. This device consists of a base plate $c$, four supports $k\ k$ on the left and right edges of this plate $c$, two parallel screw-spindles $e\ e$, several (here eight) vertical plates $d\ d$ movable on the base plate $c$, two chain wheels $s\ s$ fastened on the two screw-spindles $e\ e$, an endless chain $s'$ and a hand-crank $t$. The two screw spindles $e\ e$ are mounted to turn in the four supports $k\ k$ and are provided with alternating right and left screw-threads, which engage in nuts $d'\ d'$ secured in the plates $d\ d$. The latter are disposed in pairs and each pair of plates $d\ d$ forms a packing box, in which the wrapped cigars are placed in groups and in layers, see the left lower part of Fig. 2. By means of the endless chain $s'$ and the two chain wheels $s\ s$ the two screw-spindles $e\ e$ are connected. It will be seen, that on turning the hand-crank $t$ in the one direction, the two plates $d\ d$ of each packing box will be moved toward each other for compressing the cigars. On turning the hand-crank $t$ in the opposite direction the two plates $d\ d$ in each of the four packing boxes will be moved away from each other. Where so preferred, stops $m'\ m'$ (see Fig. 6) may be disposed on the two screw-spindles $e\ e$ for limiting the motion of the two plates $d\ d$ in each box toward each other. The plates $d\ d$ may be each provided with a border piece $d^2$ fastened on its lower edge and two loose border pieces $d^3\ d^3$ may be used for each packing box. Sheet metal pieces $g\ g$ are employed for dividing the superposed cigars in the manner shown at Fig. 6. These pieces $g\ g$ are arranged to overlap each other and their overlapping edges are beveled off or sharpened to protect the cigars from damage. The four pressing blocks $f f$ on each table $b$ may be made adjustable in their height by adding or taking off pieces, and they are made to bear on the upper sheet metal pieces $g\ g$ in the four packing boxes. Each pressing block $f f$ is made so narrow, that it can engage between the respective two plates $d\ d$ in their smallest distance from each other.

The apparatus is operated as follows: The hand-crank $t$ of a packing device is so much turned in the respective direction as to place the two plates $d\ d$ in each packing box at the desired distance from each other, after which the cigars are placed in groups and in layers in the four packing boxes, also the sheet metal pieces $g\ g$ and the loose border pieces $d^3\ d^3$, if the latter are employed. The packing device so charged is placed on the respective table $b$ of the apparatus and another packing device is charged in a similar manner and placed on another table $b$. When the whole apparatus is charged, say the two systems of links $a\ a$ are shortened so much as to produce a certain pressure in the vertical direction on the cigars. Then they are extended a little to loosen the cigars, and afterward the several hand-cranks $t\ t$ are turned one after the other to compress a little in the horizontal direction the cigars in the respective compartments of the apparatus while the cigars are permitted to expand in the vertical direction. After a little turning back the hand-cranks $t\ t$ to loosen the cigars a little, the two systems of links $a\ a$ are shortened a little further to compress the cigars in the vertical direction, while they are permitted to expand in the horizontal direction. Thereupon the systems of links $a\ a$ are again extended a little to loosen the cigars and next the hand-cranks t t are turned farther to compress the cigars a little more in the horizontal direction. In this manner the operation of the apparatus is continued, until the cigars are sufficiently compressed. After subjecting the cigars to the final pressure for a sufficient time, the two systems of links a a are again extended and the packing devices are taken off the tables b b and the cigars are released and placed in the cigar-boxes or other packages as the case may be.

Where so preferred, the supports k k on the one side of each base plate c may be arranged for turning aside and those supports on the other side may be fastened on hinges i on the base plate in the manner clearly shown at Figs. 4 and 5, so as to facilitate the discharge of the cigars by turning upward the two screw-spindles e e with the packing boxes (see Fig. 5), so that the cigars can be pushed into the respective cigar-boxes or otherwise removed. The pressing blocks f f may be varied in their height in the manner described, so as to vary at will the pressures in the several packing boxes.

The apparatus may be modified in the manner shown at Fig. 3. Here the two screw-spindles e e with the two chain wheels s s, the endless chain s' and the hand-crank t of each packing device are replaced by two systems of links a' a' similar to those a a in Fig. 1. These systems a' a' may be shortened and extended in a similar manner as the systems a a for compressing, loosening and releasing the cigars. There is a further difference between the two packing devices in that only five plates d d are required in Fig. 3 and these plates are connected with the crossing points of the two systems a' a'. They form four packing boxes, the same as the eight plates d d in Figs. 1 and 2. The four plates d d are guided on horizontal guiding rods q q, which are secured in the supports k k. The four pressing blocks f f may be disconnected from the table b above and be arranged to be placed on the upper sheet metal pieces g g in the four packing boxes. In this case vertical slotted links h h are employed for vertically guiding the pressing blocks f f. These links h h are pivotally connected with the lower free end pins of the systems a' a' and are held in their vertical positions by the upper free end pins of the systems a' a' engaging in their slots.

The apparatus shown at Figs. 7 and 8 differs from the previous one in that the systems of links a a and a' a' are replaced by rods, which serve for moving a part of the horizontal tables and the vertical plates, whereby the great wear and tear of the many pins in those systems is reduced to a minimum. This apparatus comprises a frame 1 with two stationary head plates 2, 2 secured therein and two screw-spindles e e, which are mounted to turn in four cross bars 24, 24 of the frame 1. The two screw-spindles e e are connected with each other by means of two chain wheels 34, 34, an endless chain 25 and a hand-crank 26. They are provided with right and left screw-threads, which engage in two rectangular frames 22, 22. It will be seen, that by turning the hand-cranks 26 in the one or the other direction the two frames 22, 22 will be moved toward each other or away from each other respectively. Suitable recesses 27, 27 in the two head plates 2, 2 permit this motion of the two frames 22, 22. A cross beam 10 is provided in the frame 1 for carrying a vertical screw-spindle 9, from which latter a cage of the following construction is suspended by means of a nut 8. This cage consists of a traverse 7, four vertical rods 4, 4 and two tables b b, collars 5, 5 and 6, 6 being employed for securing these parts at the proper distances from each other. The tables b b are provided with recesses 28, 28, which correspond to those 27, 27 of the head plates 2, 2. It will be now evident, that by turning the vertical screw-spindle 9 by means of a hand-wheel 11 in the one or the other direction the two tables b b will be simultaneously raised and lowered to decrease and to increase the distance between the two head plates 2, 2 and the two tables b b respectively. Two packing devices of the following construction are required for charging this apparatus. Each packing device comprises a base plate 17, four vertical guiding bolts 15, 15 secured thereon, two horizontal guiding rods q q guided at their ends on these bolts 15, 15 and six vertical plates 12, 13, 12, 13 guided on the two rods q q. The six plates 12, 13, 12, 13 form three packing boxes. Helical springs 16, 16 surrounding the guiding bolts 15, 15 carry the two guiding rods q q with the plates 12, 13, 12, 13 and serve for pressing them upward. Three alternating plates 12, 12 are rigidly connected with each other by means of four horizontal rods 19, 19 with collars 18, 18 and in a similar manner the three other plates 13, 13 are rigidly connected with each other by means of four horizontal rods 21, 21 with collars 20, 20. Of course the rods 19, 19 pass through the plates 13, 13 and the rods 21, 21 through the plates 12, 12. Helical springs 29, 29 surrounding the two guiding rods q q serve for pressing the two plates 12, 13 in each packing box away from each other, so that the left plate 12 in Fig. 7 bears against the left frame 22 and the right plate 13 against the right frame 22. Of course the base plate 17 is provided with recesses corresponding to those 28 of the table b. Within each packing box a pressing block forming its bottom is placed on the base plate 17. This pressing block consists of two recessed parts 30, 30, which overlap each other and are pressed aside by springs 33. The upper gap between the two parts 30, 30 is covered with a sheet metal piece 31, which is beveled off on two opposite edges and is fastened on the one part 30. Thus the cigars are prevented from getting into the gap and also from being damaged. This apparatus is operated as follows: The hand-wheel 11 is turned, until the cage with the two tables $b$ $b$ is quite lowered and the hand-crank 26 is turned, until the two frames 22, 22 bear on the four vertical rods 4, 4. Then the apparatus will be ready for the introduction of the two packing devices charged with cigars. After this introduction the hand-wheel 11 and the hand-crank 26 are turned, until the cigars are completely inclosed. Then after the hand-wheel 11 is so much turned as to compress the cigars a little in the vertical direction, next turned back to loosen the cigars a little. This loosening of the cigars is facilitated by the springs 16 acting upon the tables $b$ $b$ and by the springs 29, 29 acting upon the plates 12, 13, 12, 13. Thereupon the hand-crank 26 is so much turned as to compress the cigars a little in the horizontal direction, while they are permitted to stretch in the vertical direction, after which the hand-crank 26 is turned back, to loosen the cigars a little. These operations are repeated, until the cigars are sufficiently compressed. After the cigars have been left in the apparatus for the necessary time, the hand-wheel 11 and the hand-crank 26 are turned back to release the two packing devices, which can be withdrawn and emptied, after which they may be charged with fresh cigars.

It is evident, that this apparatus may be varied in many respects. The number of packing boxes in each packing device may be increased or decreased, the same as the number of the packing devices and accordingly that of the head plates 2, 2 and the tables $b$ $b$. Where so preferred, each pressing block may be made in three beveled off parts, which engage in each other and are pressed aside by means of springs, as is for example shown at 32 in Fig. 7. The horizontal rods 19, 21, 19, 21 are designed for sustaining a pressure, but it is obvious, that they may be arranged for a tensile strain.

In hitherto known boxes two-part plates were laid on the uppermost layer of cigars and served as pressing plates. The two parts of such a pressing plate overlapping each other did not impede the relative motion of the box walls, it is true, but they presented the disadvantage, that the cigars in the layer in contact therewith were liable to be damaged by the edge face of the inner part. To protect the cigars in the gap between this edge face and the opposite box wall from damages, metal sheets laid over the gap have been tried, but they did not prove safe and moreover the workpeople mostly neglected to use them. The said two-part pressing plates also presented the disadvantage, that the cigars contained in the gap were subjected to a greater pressure than the other cigars and thereby rendered different from the latter.

An improved packing box according to my invention is shown in Fig. 9 and avoids the above mentioned defects. This packing box consists of a base plate $a^4$, two vertical side plates $b^4$ and $c^4$ and a cover $d^4$, all of which are made of sheet metal. Both side plates $b^4$ and $c^4$ are provided with flanges $b'$ $b'$, which clasp the base plate $a^4$ and serve for guiding the side plates on the latter. The one side plate $c^4$ is so cut out, that the cover $d^4$ can engage in this cut, while it is vertically guided on the other side plate $b^4$ by means of its clasp $d''$. The opening between the cover $d^4$ and the edge face of the cut in the side plate $c^4$ is preferably covered with a plate $e^4$ guided on the cover $d^4$ by means of its clasp $e'$. Thus the cover $d^4$ is vertically movable and the two side plates $b^4$ and $c^4$ are horizontally movable, so that this packing box can be put in any known press provided with means for acting upon the box in the vertical and horizontal directions. Then the cigars placed in this packing box can be compressed step by step and alternately in both said directions in the manner described above. This improved packing box offers the advantage, that all its four walls in contact with the cigars are smooth, so that a perfectly uniform pressing of the cigars is insured and all danger of damaging some of the cigars is avoided.

Fig. 10 shows a modification of the above described improved packing box and differs therefrom in that a vertical partition wall $f^4$ is fastened on the base plate $a^4$ in its middle and that the cover $d^4$ is doubled. Instead of the side plate $b^4$ in Fig. 9 a second side plate $c^4$ and a second plate $e'$ are employed. In this case an adjusting device shown at Fig. 12 is preferably employed for holding the packing box during its charge with cigars, so as to insure the correct and equal contents of both compartments. This is necessary, since the pressing blocks of the press invariably act on the centers of the respective walls of the box and the pressure is equally distributed on both sides. The said adjusting device consists of a plate $h$ and a screw-spindle $k^4$ with two stopping nuts $i^4$ $i^4$. The packing box is placed with its base plate $a$ in the recess of the plate $h$ between the two ledges $l$ $l$ and is thereby centered. The screw-spindle $k^4$ is provided with two opposite screw-threads, so that by turning it the two stops $i^4$ $i^4$ are moved through equal distances in opposite directions. After so djusting the width of the two compartments of the packing box, the cigars can be filled in, after which the charged box is placed in the press.

In certain cases triangular corner pieces, such as $d^2$ $d^2$ in Fig. 6, are required to be laid in the packing box. Fig. 11 shows, how the improved packing box according to Fig. 11 may be provided with integral border pieces $g'$, $g^2$ and $g^3$ and loose corner pieces $g^4$.

What I claim as my invention, and desire to secure by Letters Patent, is—

1. An apparatus for pressing cigars comprising a fixed main frame, a lower movable supporting table guided in said frame, a fixed head plate supported above said table and abutting against said frame, movable side plates between said lower supporting table and head plate, screw spindles engaging said side plates, a packing box having adjustable sides and bottom and interposed between the movable side plates and resting on the supporting table, means for adjusting the distance between the lower supporting table and the head plate, and independent means to turn the several screw spindles for adjusting the distance between the movable side plates whereby the cigars in said packing box may be pressed in two directions at right angles to each other and the cigars step by step and alternately in both directions.

2. An apparatus for pressing cigars comprising a fixed main frame, a lower movable supporting table guided in said frame, a fixed head plate supported above said table and abutting against said main frame, a plurality of movable pressing blocks, a plurality of movable side plates between said supporting table and head plate, screw spindles engaging said side plates, packing boxes having adjustable sides and bottom and interposed between the movable side plates and resting on the supporting table, means for adjusting the distance between the supporting table and the head plate, and independent means to turn the several screw spindles for adjusting the distance between the movable side plates whereby the cigars in said packing boxes may be pressed in two directions at right angles to each other and the cigars step by step and alternately in both directions.

3. An apparatus for pressing cigars comprising a fixed main frame, a lower movable supporting table guided in said frame, a fixed head plate supported above said table and abutting against said main frame, and a plurality of movable pressing blocks, a plurality of movable side plates between said supporting table and head plate, packing boxes having adjustable sides and bottom and interposed between the movable side plates and resting on the supporting table, means for adjusting the distance between the supporting table and the head plate, independent means consisting of screw spindles with right and left screw threads engaging the several side plates for adjusting the distance between the movable side plates whereby the cigars in said packing boxes may be pressed in two directions at right angles to each other and the cigars step by step and alternately in both directions, and stops for adjustable sides of packing boxes.

4. An apparatus for pressing cigars comprising a fixed main frame, a lower movable supporting table guided in said frame, a fixed head plate supported above said table and abutting against said main frame, a plurality of movable pressing blocks, a plurality of movable side plates between said supporting table and head plate, stops for the side plates, packing boxes having adjustable sides and bottom and interposed between the movable side plates and resting on the supporting table, means for adjusting the distance between the lower supporting table and the fixed head plate, independent means consisting of screw spindles with right and left screw threads engaging the several side plates for separately adjusting the distance between the movable side plates whereby the cigars in said packing boxes may be pressed in two directions at right angles to each other and the cigars step by step and alternately in both directions and adjustable stops for adjustable sides of the packing boxes.

5. An apparatus for pressing cigars comprising a fixed main frame, movable supporting tables guided in said frame, each having movable pressing blocks, a plurality of fixed head plates supported above said tables and abutting against said frame, a plurality of movable and independent vertical plates between said supporting tables and head plates, packing boxes having adjustable sides and bottom and interposed between the said movable plates and resting on said supporting tables, means for adjusting the distance between the supporting tables and the head plates, independent means for separately adjusting the distance between the movable plates whereby the cigars in said packing boxes may be pressed in two directions at right angles to each other and the cigars step by step and alternately in both directions.

6. A packing box for cigar presses comprising a base plate, a side plate movable on said base plate, a second side plate also movable on said base plate and having a cut out section forming a notch at its upper end, a cover plate adjustably secured at one end to the side plate and its other end guided in the notch of the second side plate.

7. A packing box for cigar presses comprising a base plate, a side plate movable on said base plate, a second side plate also movable on said base plate and having a cut out section forming a notch at its upper end, a cover plate adjustably secured at one end to the side plate and its other end guided in the notch of the second side plate, and a depending adjustable plate on the cover plate adapted to close the opening formed by the notch in the second side plate.

8. A packing box for cigar presses comprising a base plate, a side plate movable on said base plate, a second side plate also movable on said base plate and having a cut out section forming a notch at its upper end, a cover plate adjustably secured at one end to the side plate and its other end guided in the notch of the second side plate, a depending adjustable plate on the cover plate adapted to close the opening formed by the notch in the second side plate, a lower plate, adjustable stops on said lower plate, adapted to engage the lower ends of the movable side plates and means for immovably seating said base plate on the lower plate.

In testimony whereof I have signed my name to this specification in the presence of two subscribing witnesses.

ROBERT WOERNER.

Witnesses:
  H. W. HARRIS,
  JOS. H. LEUTE.